United States Patent [19]

Holub et al.

[11] Patent Number: 4,762,561

[45] Date of Patent: Aug. 9, 1988

[54] VOLUME-STABLE HARDENED HYDRAULIC CEMENT

[75] Inventors: Edward P. Holub, Bethel; Richard J. Grabowski, Milford, both of Conn.

[73] Assignee: Construction Products Research, Inc., Fairfield, Conn.

[21] Appl. No.: 29,553

[22] Filed: Mar. 24, 1987

Related U.S. Application Data

[63] Continuation-in-part of Ser. No. 843,967, Mar. 25, 1986, abandoned.

[51] Int. Cl.$^4$ .............................................. C04B 7/02
[52] U.S. Cl. ...................................... 106/89; 106/104
[58] Field of Search .................................. 106/89, 104

[56] References Cited

U.S. PATENT DOCUMENTS

| | | | |
|---|---|---|---|
| 3,973,978 | 8/1976 | Nakagawa et al. | 106/104 |
| 4,045,237 | 8/1977 | Gaines et al. | 106/89 |
| 4,157,263 | 6/1979 | Gaines et al. | 106/109 |
| 4,357,166 | 11/1982 | Babcock | 106/89 |
| 4,488,909 | 12/1984 | Galer et al. | 106/89 |

*Primary Examiner*—Steven Capella
*Attorney, Agent, or Firm*—Pennie & Edmonds

[57] ABSTRACT

The hardened volume change of concrete, grout, patching material, and water-proof material made from blends of Calcium Sulfate Hemihydrate, Portland Cement and Calcium Aluminate Cement can be reduced by using Portland Cement containing low levels of iron oxide. By lowering the normal level of iron oxide in the Portland Cement used in the above composition, it was also discovered that the compressive strengths dramatically increase as well as the bond to old concrete.

21 Claims, No Drawings

VOLUME-STABLE HARDENED HYDRAULIC CEMENT

This is a continuation-in-part of application Ser. No. 843,967, filed Mar. 25, 1986, now abandoned.

FIELD OF THE INVENTION

This invention relates to improvements in the composition of hydraulic cement. More particularly, it relates to improvements in cement which consists of blends of Portland cement, calcium aluminate cement and a sulfate compound, preferably a calcium or aluminum sulfate or gypsum.

DEFINITIONS

The term "hydraulic cement" as used herein is intended to mean portland cements, expansive cements, air entraining portland cements, pozzolanic cements, slag cement, masonry cement, white portland cement, colored cement, antibacterial cement, waterproof cement, refractory cement, self-stressing cement, aluminous cement, and similar materials.

The term "gypsum" as used herein is intended to include gypsum such as is normally understood in the art. This would include calcium sulfate ($CaSO_4$) and its various forms such as calcium sulfate anhydrate, calcium sulfate hemihydrate, and calcium sulfate dihydrate, as well as calcined gypsum, pressure calcined gypsum, and plaster of Paris.

The term "aluminous cement" as used herein is intended to include those cementitious materials normally understood in the art to contain as the main cementitious constituent, mono calcium aluminate ($CaO \times Al_2O_3$). This would include high alumina cement (HAC), calcium aluminate cement, and many other commercially available alumina cements.

The term "Portland cement" as used herein is intended to include those cements normally understood in the art to be "Portland cement," such as those described in ASTM Standard C-150. The Portland cement component of these cementitious mixtures acts to reduce drying shrinkage and increase wet expansion. Other cements which act as drying shrinkage inhibitors, although not specifically referred to as Portland cement, are also suitable for use herein so that the term "Portland Cement" should be understood as encompassing those other cements. Examples of drying shrinkage inhibitors include expansion promoters such as expansive cements which are compatible with the other constituents of the system.

BACKGROUND OF THE INVENTION

There have been numerous prior attempts at providing cementitious systems to meet the needs of the construction industry, particularly in the protection, waterproofing, and repair of concrete structures. The optimum system should set within a relatively short period of time into a hard mass or coating that has sufficient strength, abrasion resistance, and corrosion resistance. It is also highly desirable that these systems possess impermeability to fluids, particularly aqueous solutions. Also, such systems should not undergo excessive hardened volume changes under either wet or dry conditions.

For commercial use, these types of cementitious systems must also possess good bonding characteristics to damp or dry surfaces, early as well as long term strength, and practical field workability. They should be capable of withstanding freezing and thawing, as well as the action of salts, solvents and other corrosive substances. Although there have been a number of cementitious mixtures that possess one or more of the above-described desirable properties, none of the prior art to date has been able to achieve all of the foregoing in one composition and previous attempts have had only limited success. U.S. Pat. No. 4,357,166 discusses some of the limitations of these prior art compositions in columns 2 and 3.

While mixtures of Portland cement, calcium aluminate cement and gypsum have been in use for years, various problems concerning their use have been encountered.

Previous compositions containing other hydraulic cements such as aluminous cement and gypsum have been shown to exhibit long term wet expansion. For example, U.S. Pat. No. 4,357,166 discloses a cementitious composition which, when mixed with water, is capable of setting rapidly to a hard mass of high compressive strength without substantial shrinkage during setting and which exhibits reduced wet and dry volume changes in the hardened state. That invention also possesses a degree of impermeability to fluids along with abrasion, erosion, and chemical resistance, as well as other characteristics which are desirable in a composition having commercial usefulness in the construction industry. The advantages of that invention are achieved by a cementitious composition comprising a mixture of an aluminous cement, a gypsum, a drying shrinkage inhibitor, and a wet expansion inhibitor. The compositions of that invention preferably use Portland cement as a drying shrinkage inhibitor and a lithium salt as the wet expansion inhibitor. However, various accelerators, retarders and other admixtures, when added to aluminous cement and gypsum compositions, can significantly affect the hardened volume change (wet or dry), thus limiting their usefulness.

Additionally, previous attempts to blend gypsum with other hydraulic cements, while producing the desired effect such as fast-setting or reduced shrinkage, have also affected the hydraulic cement's soundness, durability, workability, resistance to water or wet/dry cycling stability or permanence of the resulting cement.

U.S. Pat. No. 4,045,237 discloses a cementitious composition which, when mixed with water, is capable of setting into a hard mass in a short period of time without substantial shrinkage during setting and early hardening and possessing a high degree of impermeability to fluids. The composition comprises a particulate admixture of calcined gypsum, high alumina cement and portland cement, or it may comprise a mixture of particles of high alumina cement and pressure calcined gypsum, without the use of Portland cement.

Portland cement consists mainly of tri-calcium silicate and dicalcium silicate. To prepare this compound, two types of raw materials are usually required—one high in calcium content, such as limestone or chalk, and the other rich in silica, such as clay or shale. These raw materials ordinarily contain an appreciable concentration or iron-bearing compounds. The presence of these compounds during the heating process leads to the formation of a clinker containing several percent of iron oxide.

The structure of this Portland cement clinker will, therefore, vary considerably due to variations in the composition and particle size of the raw materials as well as inconsistencies in the burning conditions, which leads to variations in clinker porosity as well as differences in crystalline sizes and forms found in the aggregates of crystallites.

Thus, the Portland cement component of the cementitious compositions disclosed in U.S. Pat. Nos. 4,357,166 and 4,045,237 contains an appreciable quantity of iron oxide as described above. In U.S. Pat. No. 4,045,237 for example, it is critical to employ between 0.1-10% of Portland cement in the mixture. The addition of greater than 10% of Portland cement leads to difficulties with the cement hydration reactions due to the resulting proportion of ferric oxide in the Portland cement-calcined gypsum-high alumina cement mixture.

U.S. Pat. No. 4,157,263, which is a division of the application leading to the issuance of U.S. Pat. No. 4,045,237 discloses a method for using the compositions claimed in U.S. Pat. No. 4,045,237 for use in repairing and waterproofing concrete structures and for filling voids and holes to form stable underpinnings or foundations for machinery or heavy equipment. The Portland cement utilized in the performance of this method contains, as noted above, appreciable quantities of ferric oxide, which restricts the amount of Portland cement which may be added to the mixture, thus reducing the strength of the composition.

Applicants have discovered that the hardened volume changes which occur in concrete, grout, patching material and water-proofing material made from blends of calcium sulfate hemihydrate, calcium aluminate cement and Portland cement can be reduced by using Portland cement containing reduced levels of iron oxide. Applicants have further determined that such a reduction of the iron oxide used in the Portland cement component dramatically increases the compressive strength of this composition and improves its bonding capacity to previously set concrete.

The maximum iron oxide content may vary, but as a general principle it should be a maximum of about 2 weight percent. Preferably, the iron oxide content should be as low as possible, but as a practical matter, amounts lower than 0.1 weight percent are difficult to achieve.

SUMMARY OF THE INVENTION

This invention relates to improvements in the composition of hydraulic cement. More particularly it relates to improvements in cement which consists of blends of Portland cement, calcium aluminate cement and a calcium or aluminum sulfate compound.

The composition disclosed by the applicants comprises from about 0.1 to about 80 parts by weight of a Portland cement manufactured from raw materials containing low levels of iron compounds so as to have a low iron oxide content; from about 0.1 to about 40 parts by weight of a calcium or aluminum sulfate compound, preferably gypsum and from about 2 to about 90 parts by weight of an aluminous cement. The most advantageous composition includes about 2 to 20 parts by weight of the low iron Portland cement, 55 to 95 parts by weight of the aluminous cement and 2 to 10 parts by weight of gypsum.

While any sulfate compound can be used in this invention, organic or inorganic sulfate salts are preferred. Calcium sulfate provides the best results and is the most advantageous whether used as a pure chemical, formed in situ, or added in its common form, gypsum. Aluminum ammonium sulfate ($AlNH_4(SO_4)_2$) and aluminum potassium sulfate ($AlK(SO_4)_2$) also provide good results. Other alkali metal sulfates have not been found to be useful, and satisfactory performance is found only with the calcium and/or aluminum sulfates. Due to its availability, gypsum in any of its various forms, is most advantageous sulfate compound.

In one embodiment of the cementitious composition, the maximum iron oxide content of the Portland cement is 2 weight percent, measured as ferric oxide according to ASTM test method C-114. In a further embodiment the gypsum selected for use in applicants' composition is calcium sulfate hemihydrate.

Applicants' composition may further comprise a number of additional ingredients and additives, which may include up to about 90% by weight of an aggregate based upon a total weight of Portland cement, sulfate compound and aluminous cement in the composition. Additional ingredients may include a compound capable of generating a volume of gas upon contact with water, a surface active agent, a water reducing agent and a set time controlling agent.

Applicants' volume-stable cementitious composition therefore comprises from about 0.1 to about 80, preferably 2 to 20, parts by weight of a Portland cement having a maximum iron oxide content of 2 weight percent; from about 0.1 to about 40, preferably 2 to 10, parts by weight of the sulfate compound and from about 2 to about 90, preferably 55 to 90 parts by weight of an aluminous cement.

Applicants have also discovered a novel method for producing their volume-stable cementitious composition which comprises blending, for a predetermined duration, a mixture comprising from about 0.1 to about 80 parts by weight of a Portland cement manufactured from raw materials containing low levels of iron compounds so as to contain less than about 2% iron oxide; from about 0.1 to about 40 parts by weight of a calcium or aluminum sulfate compound and from about 2 to about 90 parts of weight of aluminous cement, and thereafter hydrating this mixture with water.

The method developed by the applicants may include several additional steps, which include adding to the mixture an amount of from about 1 to about 90 parts by weight of an aggregate based upon the total weight of Portland cement, sulfate compound and aluminous cement before hydrating the mixture with water. In addition, one may also add to the mixture at least one of an accelerator, a retarder, a pigment, a water reducer or a gas generating agent.

The product produced by practicing the method disclosed herein by the applicants is also novel and should be considered part of their invention.

The improvement in the cementitious composition disclosed by applicant comprises controlling the maximum iron oxide content of the Portland cement to about 2 weight percent in order to obtain improved volume stability, higher strength and better bonding strength to other cementitious compostions. The improvement further comprises decreasing the setting time for the composition by reducing the iron oxide content of the cement to as low a value as possible. The iron oxide content should range between 0.1 and 2 weight percent in applicants' composition.

DETAILED DESCRIPTION OF THE PREFERRED EMBODIMENTS

The following examples are presented for the purpose of illustrating, without limitation, the novel cementitious composition of the invention and the advantages thereof. In the examples, parts and percentages are by weight unless otherwise indicated.

EXAMPLE 1

A composition comprising calcium aluminate cement, calcium sulfate hemihydrate and portland cement wherein the portland cement was manufactured from compounds containing a "normal" amount of ferric oxide, about 2.3 weight percent, is utilized.

The following ingredients were dry blended for one minute:

| Substance | Weight Percent |
| --- | --- |
| Portland cement | 8 |
| Calcium aluminate cement | 25 |
| Calcium sulfate hemihydrate | 5 |
| Dried Fluid Coke | 3 |
| Melment F-10 | 0.5 |
| Lithium Carbonate | 0.09 |
| Citric Acid | 0.12 |
| Sand | 58.29 |
| | 100 |

After dry mixing, 12.5 parts of water were added to hydrate the mix, and the following characteristics were determined:

| Time | Compressive Strength |
| --- | --- |
| 1 hour | 900 psi |
| 3 hours | 3,000 psi |
| 24 hours | 6,300 psi |

Shrinkage and expansion tests were performed on a hardened 11 inch bar cast from the composition:
Dry shrinkage=0.0196% after 14 days storage at 50% humidity
Wet expansion=0.0130% after immersion in water

EXAMPLE 2

The same components as found in Example 1 were utilized in the same proportions. In this example, however, the Portland cement was manufactured from raw materials containing low levels of iron compounds and contained 0.4 weight percent of ferric oxide.

The following improvements over the values from Example 1 were noted after hydration of the composition:

| Time | Compressive Strength |
| --- | --- |
| 1 hour | 4,500 psi |
| 3 hours | 9,000 psi |
| 24 hours | 11,000 psi |
| Dry shrinkage = 0.0003% after 14 days storage at 50% humidity | |
| Wet expansion = 0.0004% after immersion in water | |

A 50% increase in bonding strength over the composition as described in Example 1 was also noted as well as a drastic decrease in the water absorption and permeability of the hydrated product.

Examples 3 and 4 further show the improvement that low iron oxide portland cements provide.

In Example 3, the following ingredients were dry blended for one minute:

EXAMPLE 3

| Substance | Weight Percent |
| --- | --- |
| Portland cement | 8 |
| Calcium aluminate cement | 25 |
| Calcium sulfate hemihydrate | 5 |
| Dried fluid coke | 3 |
| Melment F-10 | 0.5 |
| Sand | 58.5 |

As in Example 1, the portland cement contained about 2.3 weight percent ferric oxide. After dry mixing, 12.5% water was added to hydrate the mix and the following characteristics were determined:

| Time | Compressive Strength |
| --- | --- |
| 3 hours | 975 psi |
| 24 hours | 8,525 psi |
| 7 days | 9,500 psi |

Dry shrinkage=0.0736% after 28 days storage at 50% relative humidity
Wet expansion=Could not be determined because the bars would destruct when immersed in water.

EXAMPLE 4

The components used in Example 3 were once again utilized in the same proportions. In this example, however, the Portland cement was manufactured from raw materials containing low levels of iron compounds as in Example 2 (i.e., a ferric oxide content of 0.4 weight percent).

The following improvements over the values from Example 3 were noted after hydration of the composition:

| Time | Compressive Strength |
| --- | --- |
| 3 hours | 5,750 psi |
| 24 hours | 8,925 psi |
| 7 days | 11,075 psi |

Dry shrinkage=0.04% after 28 days at 50% relative humidity.
Wet expansion=0.0073% after 28 days immersion in water.

While any gypsum can be utilized in these formulations, calcium sulfate hemihydrate has been found to provide the most effective results. The Melment F-10 compound used in the examples, is a well-known water reducing agent which is available from American Admixtures, Chicago, Ill. Other water reducing agents can also be used in this invention.

In addition to the three essential components of the cementitious composition of this invention, the normal additives that are added to concrete can, of course, be used. These include, but are not limited to, accelerators, retarders, pigments, air entraining agents, water reducers, pumping aids, fly ash, gas generating and releasing agents and, of course, the full range of aggregates.

While it is apparent that the invention disclosed herein is calculated to provide an improved cementitious system over those described in the prior art, it will be appreciated that alternate embodiments may be devised by those skilled in the art. It is therefore intended that the appended claims cover all modifications or embodiments as fall within the true spirit and scope of the present invention.

We claim:

1. A volume stable, cementitious composition comprising:
   from about 0.1 to about 80 parts by weight of a Portland cement which is manufactured from raw materials containing low levels of iron compounds so as to have less than about 2% by weight of iron oxide in the Portland cement;
   from about 0.1 to about 40 parts by weight of a calcium or aluminate sulfate compound; and
   from about 2 to about 90 parts by weight of an aluminous cement.

2. The cementitious composition of claim 1 wherein the sulfate compound is calcium sulfate, aluminum ammonium sulfate, aluminum potassium sulfate, or mixtures thereof.

3. The cementitious composition of claim 1 wherein the sulfate compound is gypsum.

4. The cementitious composition of claim 3 wherein the gypsum is calcium sulfate hemihydrate.

5. The cementitious composition of claim 1 further comprising up to about 90% by weight of an aggregate based upon a total weight of Portland cement, sulfate compound, and aluminous cement in the composition.

6. The cementitious composition of claim 1 further comprising a compound capable of generating a volume of gas upon contact with water.

7. The cementitious composition of claim 1 further comprising a surface active agent.

8. The cementitious composition of claim 1 further comprising a water reducing agent.

9. The cementitious composition of claim 1 further comprising a set time controlling agent.

10. A volume stable, cementitious composition comprising:
    from about 0.1 to about 80 parts by weight of a Portland cement having a maximum iron oxide content of 2 weight percent; from about 0.1 to about 40 parts by weight of calcium sulfate hemihydrate; and from about 2 to about 90 parts by weight of an aluminous cement.

11. A method for making a volume stable cementitious composition comprising:
    blending a mixture comprising from about 0.1 to about 80 parts by weight of a Portland cement which is manufactured from raw materials containing low levels of iron compounds so as to have less than about 2% by weight of iron oxide in the Portland cement, from about 0.1 to about 40 parts by weight of a calcium or aluminum sulfate compound and from about 2 to about 90 parts by weight of aluminous cement; and
    hydrating said mixture with water.

12. The method of claim 11 which further comprises adding to said mixture an amount of from about 1 to about 90 percent by weight of an aggregate based upon the total weight of Portland cement, sulfate compound and aluminous cement before hydrating the mixture with water.

13. The method of claim 10 which further comprises dry blending with said mixture at least one of an accelerator, a retarder, a pigment, a water reducer or a gas generating agent.

14. The cementitious composition produced by the method of claim 11.

15. A volume stable cementitious composition comprising between about 2 and 20 parts by weight Portland cement having an iron oxide content of less than about 2 weight percent, between about 2 and 10 weight percent calcium sulfate, and between about 55 and 90 weight percent aluminous cement.

16. The cementitious composition of claim 15 wherein the calcium sulfate is gypsum.

17. The cementitious composition of claim 15 wherein the calcium sulfate is formed in situ by adding calcium nitrate and sodium sulfate to the composition.

18. The cementitious composition of claim 14 wherein the sulfate compound is gypsum.

19. The cementitious composition of claim 14 wherein the sulfate compound is aluminum potassium sulfate or aluminum ammonium sulfate.

20. The cementitious composition of claim 14 wherein the Portland cement is present in an amount of between about 2 and 20 parts by weight, the sulfate compound is present in an amount of between about 2 and 10 parts by weight, and the aluminous cement is present in an amount of between about 55 and 90 parts by weight.

21. The cementitious composition of claim 20 wherein the iron oxide content of the Portland cement is between 0.1 and 2 weight percent.

* * * * *